(12) United States Patent
Berestetsky et al.

(10) Patent No.: US 11,016,735 B2
(45) Date of Patent: May 25, 2021

(54) EXTENSIBLE META MODEL FOR CAPTURING SOLUTION PATTERNS

(71) Applicant: International Business Machines Corporation, Armonk, NY (US)

(72) Inventors: Vadim Berestetsky, North York (CA); Allen V. Chan, Markham (CA); Suman K. Kalia, Maple (CA); Peter A. Lambros, Southampton (GB); Stephen Rea, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 16/112,272

(22) Filed: Aug. 24, 2018

(65) Prior Publication Data

US 2018/0364986 A1 Dec. 20, 2018

Related U.S. Application Data

(63) Continuation of application No. 14/970,133, filed on Dec. 15, 2015, now Pat. No. 10,083,010, which is a continuation of application No. 12/767,704, filed on Apr. 26, 2010, now Pat. No. 9,244,659.

(51) Int. Cl.
*G06F 8/20* (2018.01)
*H04N 21/431* (2011.01)
*G06F 8/36* (2018.01)

(52) U.S. Cl.
CPC ............ *G06F 8/20* (2013.01); *G06F 8/36* (2013.01); *H04N 21/4316* (2013.01)

(58) Field of Classification Search
CPC .................................. G06F 8/20; G06F 8/36
See application file for complete search history.

(56) References Cited

U.S. PATENT DOCUMENTS

| 5,864,862 | A | 1/1999 | Kriens et al. |
| 6,226,792 | B1 | 5/2001 | Goiffon et al. |
| 6,851,105 | B1 | 2/2005 | Coad et al. |
| 7,412,687 | B2 | 8/2008 | Goodwin et al. |
| 8,291,371 | B2 | 10/2012 | Beaton et al. |
| 9,244,659 | B2 | 1/2016 | Berestetsky et al. |
| 2003/0144849 | A1 | 7/2003 | Kakivaya et al. |

(Continued)

OTHER PUBLICATIONS

Dare Obasanjo, W3C XML Schema Design Patterns: Dealing with Change, Article, Jul. 3, 2002, pp. 1-8, O'Reilly Media, within Office Action for U.S. Appl. No. 12/767,704 (cited May 4, 2015).

(Continued)

*Primary Examiner* — Brittany N Allen
(74) *Attorney, Agent, or Firm* — Christopher M. Pignato; Nicholas L. Cadmus (57) ABSTRACT

An XML schema defining elements representing different point of variability (POV) types for points of variability of a pattern is provided. The elements belong to an XML schema POV data-type substitution group that allows the POV types to be substituted for one another. A pattern author is allowed to add new or custom POV data types to the substitution group, thereby allowing the pattern author to extend the pattern meta model to include new POV data types. Once the desired POV data types are defined, the pattern author is allowed to generate an instance of the pattern that applies programmatic operations of the new or custom POV data types created and substituted by the end user to each respective system object.

18 Claims, 9 Drawing Sheets

(56) References Cited

U.S. PATENT DOCUMENTS

| | | |
|---|---|---|
| 2004/0015822 A1 | 1/2004 | Linton et al. |
| 2004/0261059 A1 | 12/2004 | Spencer et al. |
| 2005/0085937 A1 | 4/2005 | Goodwin et al. |
| 2006/0089828 A1 | 4/2006 | Larsen et al. |
| 2006/0168557 A1 | 7/2006 | Agrawal et al. |
| 2007/0006121 A1 | 1/2007 | Jezierski et al. |
| 2007/0156764 A1 | 7/2007 | O'Connell et al. |
| 2008/0046453 A1 | 2/2008 | Kostoulas et al. |
| 2008/0288944 A1 | 11/2008 | Coqueret et al. |
| 2009/0024424 A1 | 1/2009 | T et al. |
| 2009/0094576 A1 | 4/2009 | Bouchard, Sr. et al. |
| 2009/0099855 A1 | 4/2009 | Narendra et al. |
| 2009/0138293 A1 | 5/2009 | Lane et al. |
| 2011/0179089 A1 | 7/2011 | Idicula et al. |
| 2011/0185294 A1 | 7/2011 | Binder et al. |
| 2016/0098251 A1 | 4/2016 | Berestetsky et al. |

OTHER PUBLICATIONS

Marco Sinnema, et al., COVAMOF: A Framework for Modeling Variability in Software Product Families, In Proceedings of the Third Software Line Conference (SPLC 2004), Aug. 2004, pp. 197-213, vol. 3154 (LNCS 3154), Springer Verlag Lecture Notes on Computer Science, Boston, MA, USA.

Felix Bachmann, et al., Managing Variability in Software Architectures, In Proceedings of the ACM Symposium on Software Reusability: Puffing Software Reuse in Context, 2001, pp. 126-132, Association for Computing Machinery, New York, NY, USA.

H. Hadaytullah, et al., Using model customization for variability management in service compositions, In Proceedings of IEEE International Conference on Web Services, Jul. 6-10, 2009, pp. 687-694, IEEE, Los Angeles, CA, USA.

United States Patent and Trademark Office, Office Action for U.S. Appl. No. 12/767,704, dated Jan. 13, 2012, pp. 1-15, Alexandria, VA, USA.

United States Patent and Trademark Office, Office Action for U.S. Appl. No. 12/767,704, dated Aug. 16, 2012, pp. 1-14, Alexandria, VA, USA.

United States Patent and Trademark Office, Office Action for U.S. Appl. No. 12/767,704, dated Nov. 26, 2012, pp. 1-13, Alexandria, VA, USA.

United States Patent and Trademark Office, Office Action for U.S. Appl. No. 12/767,704, dated Feb. 11, 2014, pp. 1-13, Alexandria, VA, USA.

United States Patent and Trademark Office, Office Action for U.S. Appl. No. 12/767,704, dated Jul. 18, 2014, pp. 1-15, Alexandria, VA, USA.

United States Patent and Trademark Office, Advisory Action for U.S. Appl. No. 12/767,704, dated Oct. 2, 2014, pp. 1-3, Alexandria, VA, USA.

United States Patent and Trademark Office, Office Action for U.S. Appl. No. 12/767,704, dated May 4, 2015, pp. 1-13, Alexandria, VA, USA.

United States Patent and Trademark Office, Notice of Allowance for U.S. Appl. No. 12/767,704, dated Sep. 17, 2015, pp. 1-21, Alexandria, VA, USA.

United States Patent and Trademark Office, Office Action for U.S. Appl. No. 14/970,133, dated Jun. 23, 2017, pp. 1-29, Alexandria, VA, USA.

United States Patent and Trademark Office, Office Action for U.S. Appl. No. 14/970,133, dated Dec. 6, 2017, pp. 1-26, Alexandria, VA, USA.

United States Patent and Trademark Office, Advisory Action for U.S. Appl. No. 14/970,133, dated Mar. 1, 2018, pp. 1-4, Alexandria, VA, USA.

United States Patent and Trademark Office, Notice of Allowance for U.S. Appl. No. 14/970,133, dated May 23, 2018, pp. 1-18, Alexandria, VA, USA.

```
<xsd:element name="complexPov" type="patterns:ComplexPov"
      substitutionGroup="patterns:pov" />

<!-- Represents POV of non-repeating complex type -->
      <xsd:complexType name="ComplexPov">
            <xsd:complexContent>
                  <xsd:extension base="patterns:Pov">
                        <xsd:sequence>
                              <xsd:element maxOccurs="unbounded" minOccurs="0"
                                    name="action" type="patterns:Action" />
                              <xsd:element name="array"
                                    type="patterns:ComplexPropertyType" />
                        </xsd:sequence>
                        <xsd:attributeGroup ref="patterns:commonAttributeGroup" />
                  </xsd:extension>
            </xsd:complexContent>
      </xsd:complexType>

<xsd:attributeGroup name="commonAttributeGroup">
            <xsd:attribute name="name" type="xsd:string" use="required" />
            <xsd:attribute name="propertyEditor" type="xsd:string" />
      </xsd:attributeGroup>

<xsd:complexType name="ComplexPropertyType">
            <xsd:sequence>
                  <xsd:element maxOccurs="unbounded" minOccurs="1" name="row"
                        type="patterns:ColumnType" />
            </xsd:sequence>
      </xsd:complexType>

<!-- Describes name and default value of individual table cell. Note that cell can be of
xsd:anySimpleType -->
      <xsd:complexType name="ColumnType">
            <xsd:attribute name="name" type="xsd:string" use="required" />
            <xsd:attribute name="defaultValue" type="xsd:anySimpleType" />
      </xsd:complexType>
```

Fig. 8

```xml
<xsd:element name="complexTablePov" type="patterns:ComplexTablePov"
    substitutionGroup="patterns:pov" />

<!-- Derived type that describes complex property -->
    <xsd:complexType name="ComplexTablePov">
        <xsd:complexContent>
            <xsd:extension base="patterns:Pov">
                <xsd:sequence>
                    <xsd:element maxOccurs="unbounded" minOccurs="0"
                            name="action" type="patterns:Action" />
                    <xsd:element name="table"
                            type="patterns:ComplexTablePropertyType" />
                </xsd:sequence>
                <xsd:attributeGroup ref="patterns:commonAttributeGroup" />
            </xsd:extension>
        </xsd:complexContent>
    </xsd:complexType>

<!-- This type describes complex property layout and default values -->
    <xsd:complexType name="ComplexTablePropertyType">
        <xsd:sequence>
            <!-- [0..*] column descriptors - one for each column -->
            <xsd:element name="columnDescriptor"
                    type="patterns:ColumnDescriptorType" minOccurs="1"
                    maxOccurs="unbounded" />
            <!-- [0..*] row instances -->
            <xsd:element maxOccurs="unbounded" minOccurs="1" name="row"
                    type="patterns:RowType" />
        </xsd:sequence>
    </xsd:complexType>

<!-- Descriptor of individual table columns - captures meta-info which is common to
            all cells in the colunm -->
    <xsd:complexType name="ColumnDescriptorType">
        <xsd:attributeGroup ref="patterns:commonAttributeGroup" />
    </xsd:complexType>

<!-- Table contains 1 or more rows. Each cell in the row is of 'ColumnType' -->
    <xsd:complexType name="RowType">
        <xsd:sequence>
            <xsd:element maxOccurs="unbounded" minOccurs="1"
                    name="column" type="patterns:ColumnType" />
        </xsd:sequence>
    </xsd:complexType>
```

Fig. 9

EXTENSIBLE META MODEL FOR CAPTURING SOLUTION PATTERNS

BACKGROUND

This invention relates to software solution patterns, and more particularly to apparatus and methods for capturing software solution patterns and associated points of variability.

In the field of computer science, a "pattern" is a type of problem that occurs over and over again, and an abstract solution to the problem that can be used over and over again to solve the problem. Patterns can take on various different forms, including "design patterns," "architectural patterns," and "integration patterns." A design pattern is a general reusable solution to a commonly occurring software design problem. The design pattern is typically not a finished design that is transformable directly into code, but rather a description or template to solve a problem that can be used in many different situations. By contrast, architectural patterns are software patterns that offer well-established solutions to architectural problems in software engineering. Architectural patterns are typically larger in scale than design patterns. Integration patterns, by contrast, are software patterns used to make disparate applications work together in a unified manner.

To improve programmer productivity and facilitate easy adoption of best practices for solutions to commonly occurring problems in specific domains, there is a need for prefabricated solution patterns, built by subject matter experts, which can be easily implemented in end user environments. One key issue when building solution patterns is to determine which parts of the pattern (referred to as "points of variability" or "pattern parameters") can be changed by the end user. These points of variability can be very simple, such as strings or integer values, or very complex, such as multi-dimensional arrays of complex structures. In certain cases, the type and complexity of points of variability that may be eventually used in a pattern may not be known at the time the pattern template is created.

In view of the foregoing, what is needed is an extensible meta model for capturing patterns and associated points of variability. Ideally, such a meta model would provide a mechanism for capturing points of variability of arbitrary complexity or type in a manner that is extensible and independent of the domain of application of the pattern. Such an extensible mechanism would enable the construction of general tools for capturing and employing patterns in any arbitrary domain of application, including new domains that do not exist at the time tooling is constructed. Further needed are mechanisms for capturing default values for a pattern's points of variability.

SUMMARY

The invention has been developed in response to the present state of the art and, in particular, in response to the problems and needs in the art that have not yet been fully solved by currently available apparatus and methods. Accordingly, the invention has been developed to provide an apparatus and method for capturing patterns and associated points of variability. The features and advantages of the invention will become more fully apparent from the following description and appended claims, or may be learned by practice of the invention as set forth hereinafter.

Consistent with the foregoing, a method for capturing patterns and associated points of variability is disclosed herein. Such a method includes providing an XML schema defining elements representing different point of variability (POV) types for a pattern. The elements belong to an XML schema "substitution group" to enable the POV types to be substituted for one another. In selected embodiments, the method enables a pattern author to add new or custom POV types to the "substitution group," thereby allowing the pattern author to extend the pattern meta model to include new POV types. Once the desired POV types are defined, the method enables the pattern author to generate an instance of the XML schema, defining the points of variability for a specific pattern, using the elements defined in the XML schema "substitution group."

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 9 is a code sample showing an example of an extensible markup language (XML) schema definition for a multi-dimensional (i.e., multiple column) array of values.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of processes, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1A:
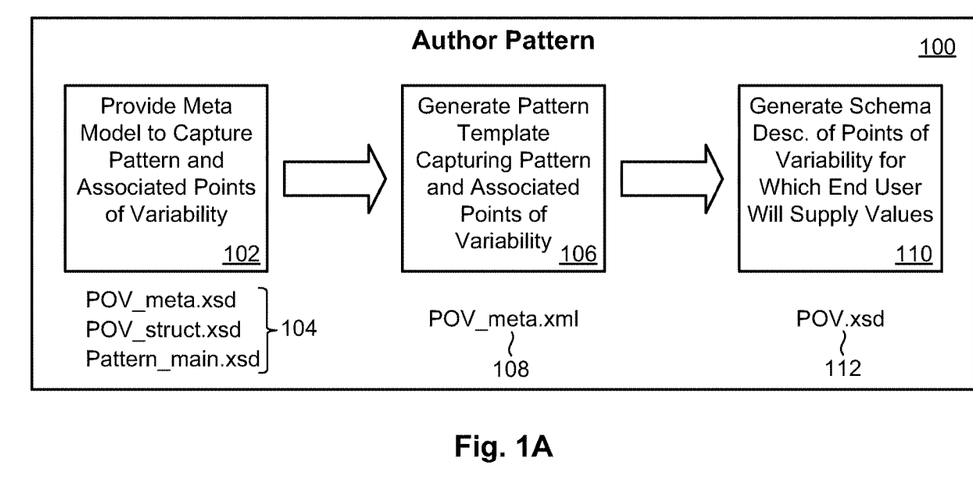
FIG. 1A is a high-level flow diagram showing one example of a method for authoring a pattern.
Figure 1B:
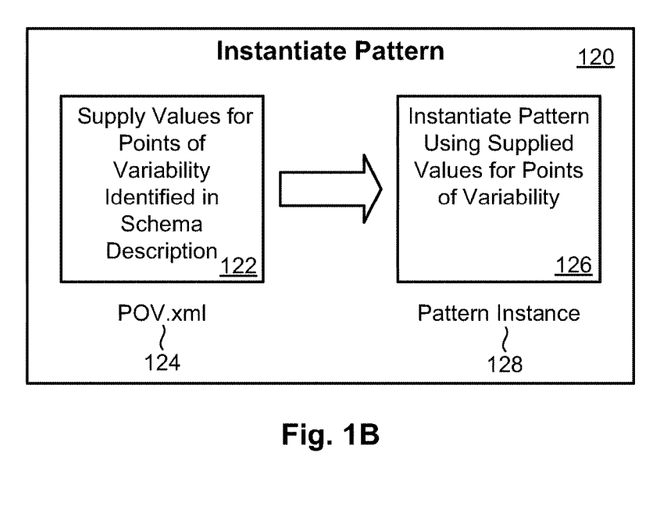
FIG. 1B is a high-level flow diagram showing one example of a method for instantiating a pattern.
Figure 3:
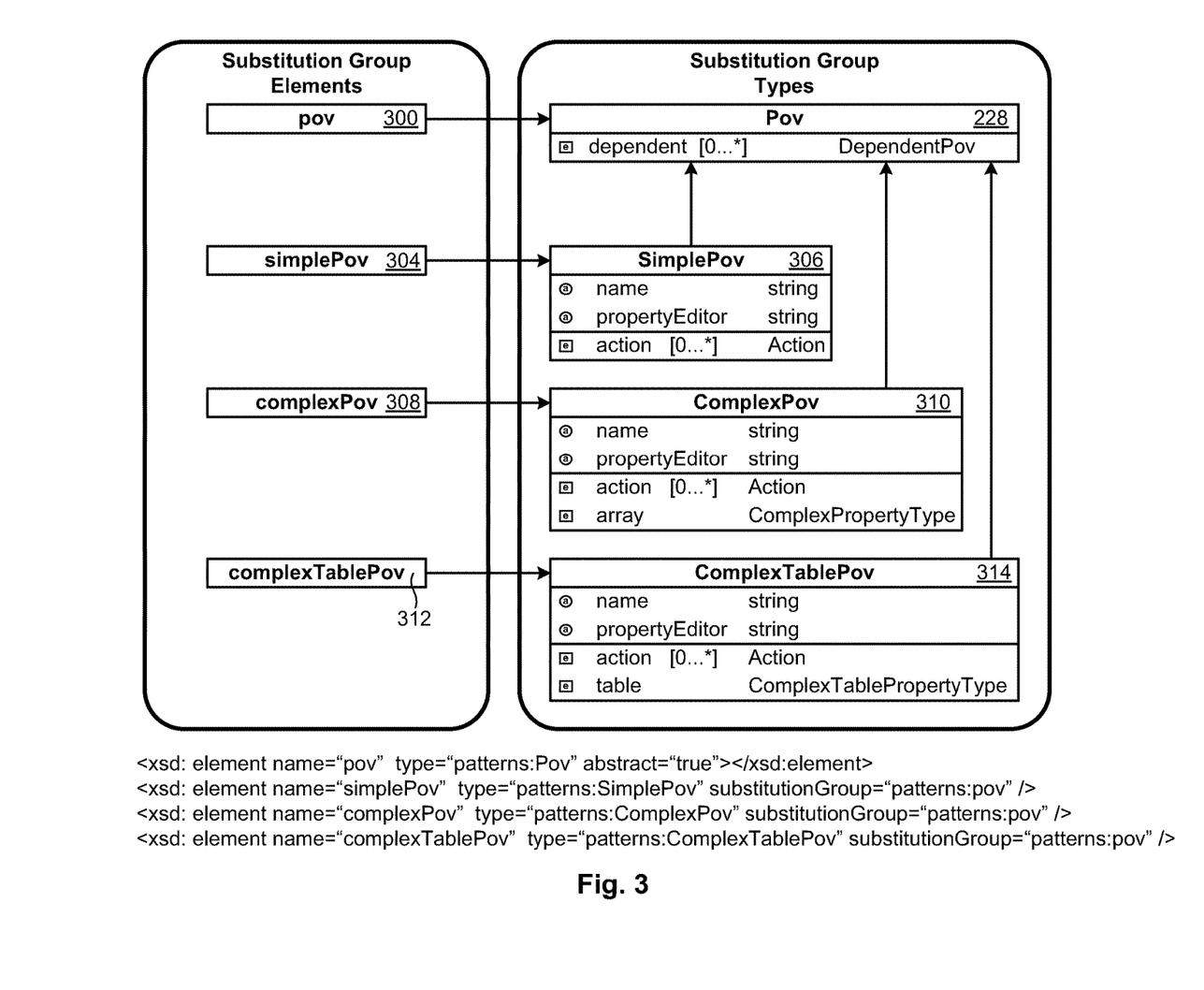
FIG. 3 is a graphical representation of an extensible markup language (XML) schema "substitution group" that includes various point of variability types.
Figure 4:
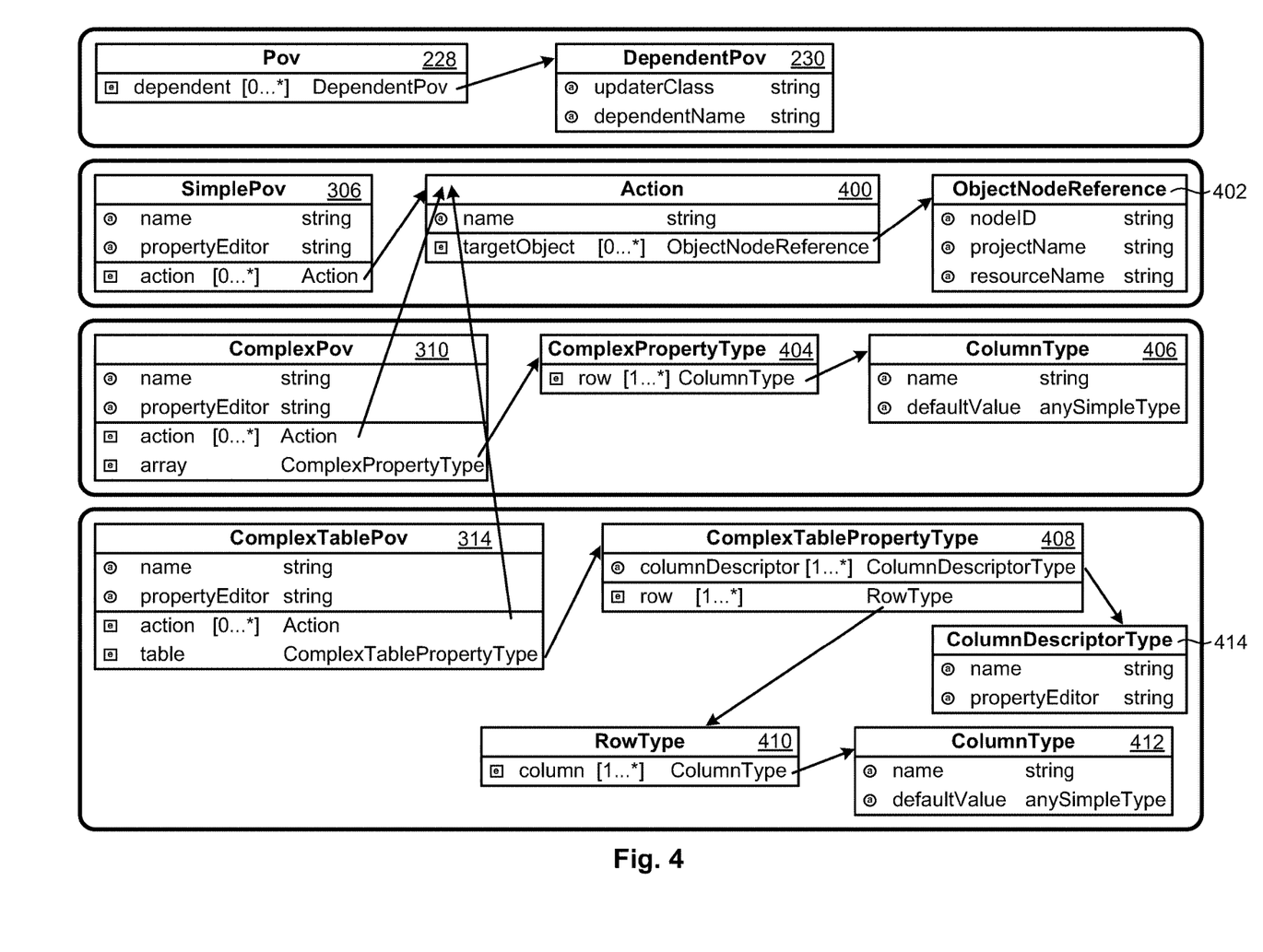
FIG. 4 is a graphical representation showing how default values are captured for various point of variability types.

Referring to FIG. 1A, one example of a method 100 for authoring a pattern is illustrated. FIGS. 1A and 1B show the complete lifecycle of a pattern, beginning with the authoring 100 of the pattern and ending with the instantiation 120 of the pattern by an end user. As shown in FIG. 1A, the authoring method 100 initially provides 102 a meta model to capture a pattern and associated points of variability. The meta model may be embodied in one or more artifacts 104. For example, the "POV_meta.xsd" artifact 104 may define the POV types that may be included in a pattern. These POV types may include simple POV types, such as integers or strings, or complex POV types, such as single or multi-dimensional arrays of values. In certain embodiments, the POV types are included in an extensible markup language (XML) schema "substitution group," which allows the POV types to be substituted for one another. This allows a pattern author to add new or custom POV types to the substitution group if and when they are needed, thereby allowing new or custom POV types to be plugged into the model framework. A visual representation of the "POV_meta.xsd" artifact 104 is illustrated in FIGS. 3 and 4, the details of which will be discussed in more detail hereafter.

Figure 5:
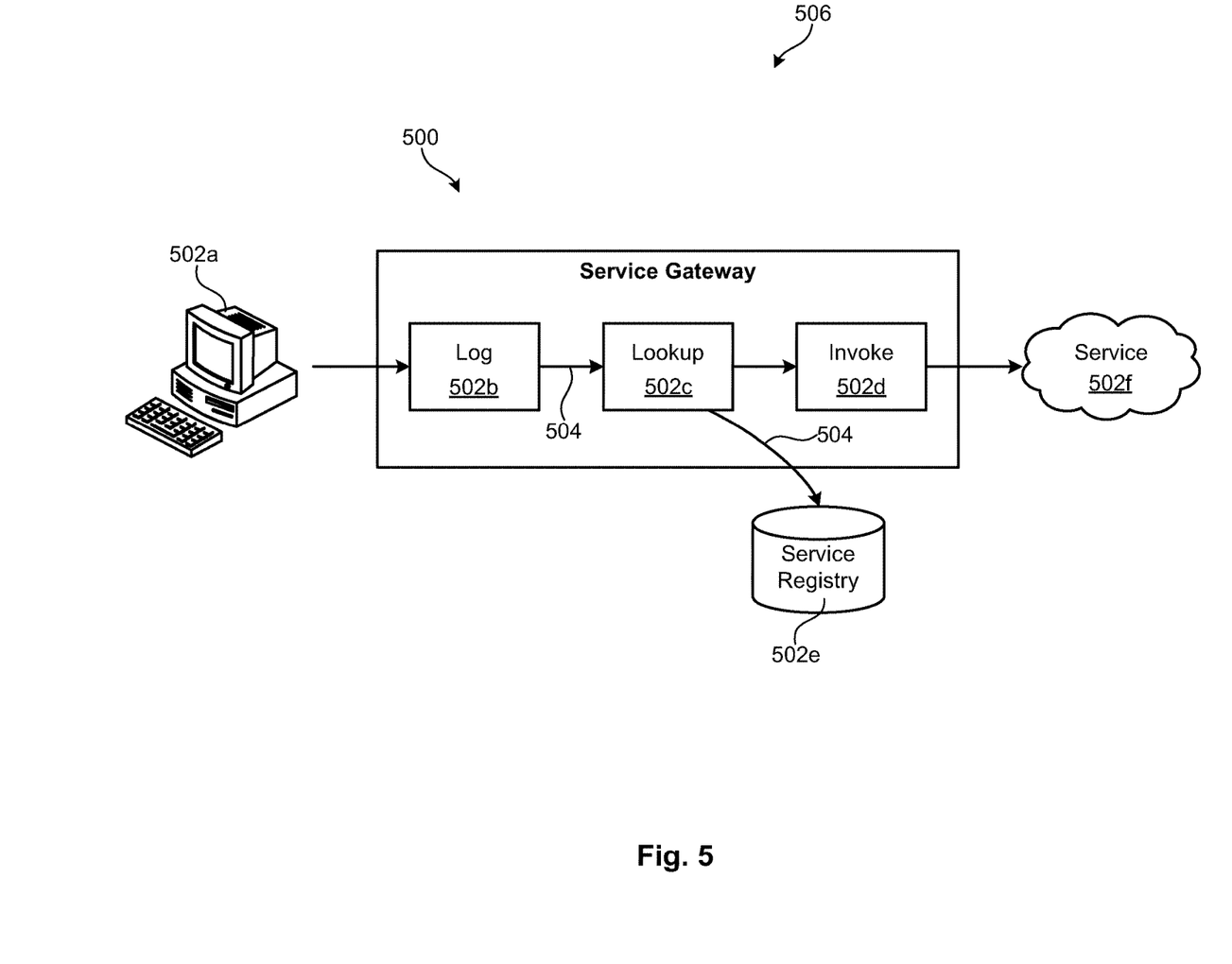
FIG. 5 shows one example of a concept diagram for describing a pattern.
Figure 6:
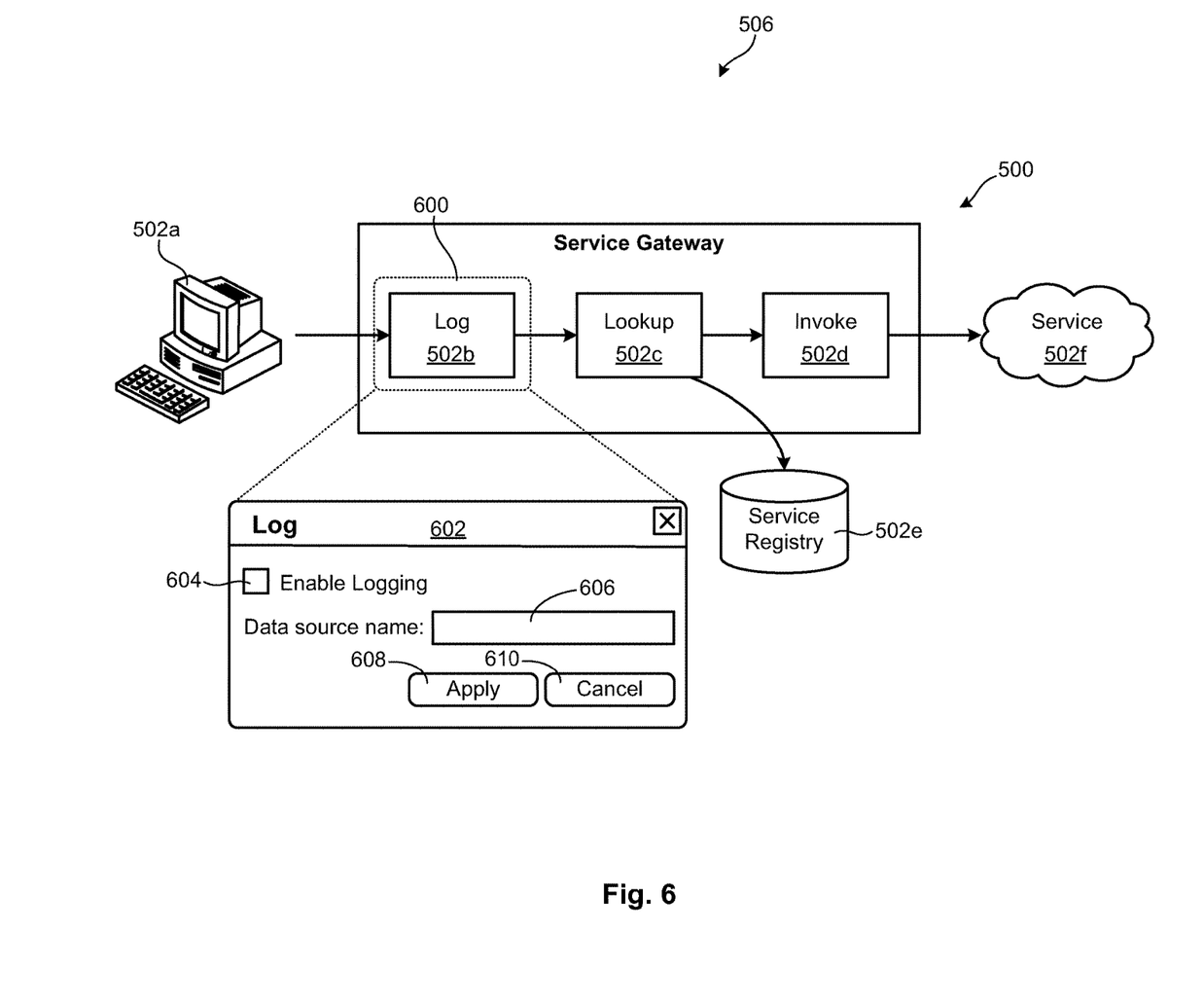
FIG. 6 shows one example of a concept diagram hotspot that enables an end user to enter values for a point of variability.

The "POV_struct.xsd" artifact 104 may provide the meta model needed to define a "pattern definition" and "pattern concept." The pattern definition may provide different types of information about the pattern whereas the pattern concept may provide a high-level conceptual diagram of the pattern that captures the overall intent and functionality of the pattern. The pattern definition and pattern concept will be discussed in more detail in association with FIG. 2. One example of a pattern concept diagram is illustrated in FIGS. 5 and 6. The "Pattern_main.xsd" artifact 104 may be used to link the pattern POVs (as defined in the "POV_meta.xsd" artifact 104) to the pattern definition and pattern concept (as defined in the "POV_struct.xsd" artifact 104).

Once the pattern meta model is provided 102, the pattern author may generate 106 a pattern template capturing a specific pattern and its particular points of variability. The points of variability may be captured in a "POV_meta.xml" artifact 108, which is an instance of the "POV_meta.xsd" artifact 104. Using the "POV_meta.xml" artifact 108, the pattern author may generate 110 a schema description of the points of variability for which an end user of the pattern will supply values. The pattern author may also designate default values that may be used to populate these points of variability in the event the end user does not supply the values. This will allow the pattern to be instantiated without any input from a user or application. The points of variability identified in step 110 and the default values may be defined in the "POV.xsd" artifact 112. In certain embodiments, the points of variability defined in the "POV.xsd" artifact 112 may be a subset of those captured in the "POV_meta.xml" artifact 108.

The meta model described above provides a mechanism to capture points of variability for any given pattern in a manner that is extensible and independent of the domain of application of the pattern. It also provides a mechanism to capture points of variability of arbitrary complexity or type. Providing such an extensible mechanism for capturing points of variability enables the construction of general tools for capturing and employing patterns that are not limited to one specialized area of application, but to arbitrary domains, or even to new areas that do not exist at the time tooling is constructed. Supporting arbitrary complexity in the points of variability provides a significant amount of flexibility since it is often impossible to know, a priori, how an arbitrary pattern may need to vary.

Referring to FIG. 1B, a high-level flow diagram showing one example of a method 120 for instantiating a pattern is illustrated. Once the pattern template is authored 100, an end user may instantiate the pattern by supplying 122 values for the points of variability identified in step 110 (and defined in the "POV.xsd" artifact 112). These values may be captured in an artifact, such as the "POV.xml" artifact 124, which is an instance of the "POV.xsd" artifact 112. Once these values are captured, the end user may instantiate 126 the pattern using the values. This may create a pattern instance 128.

Figure 2:
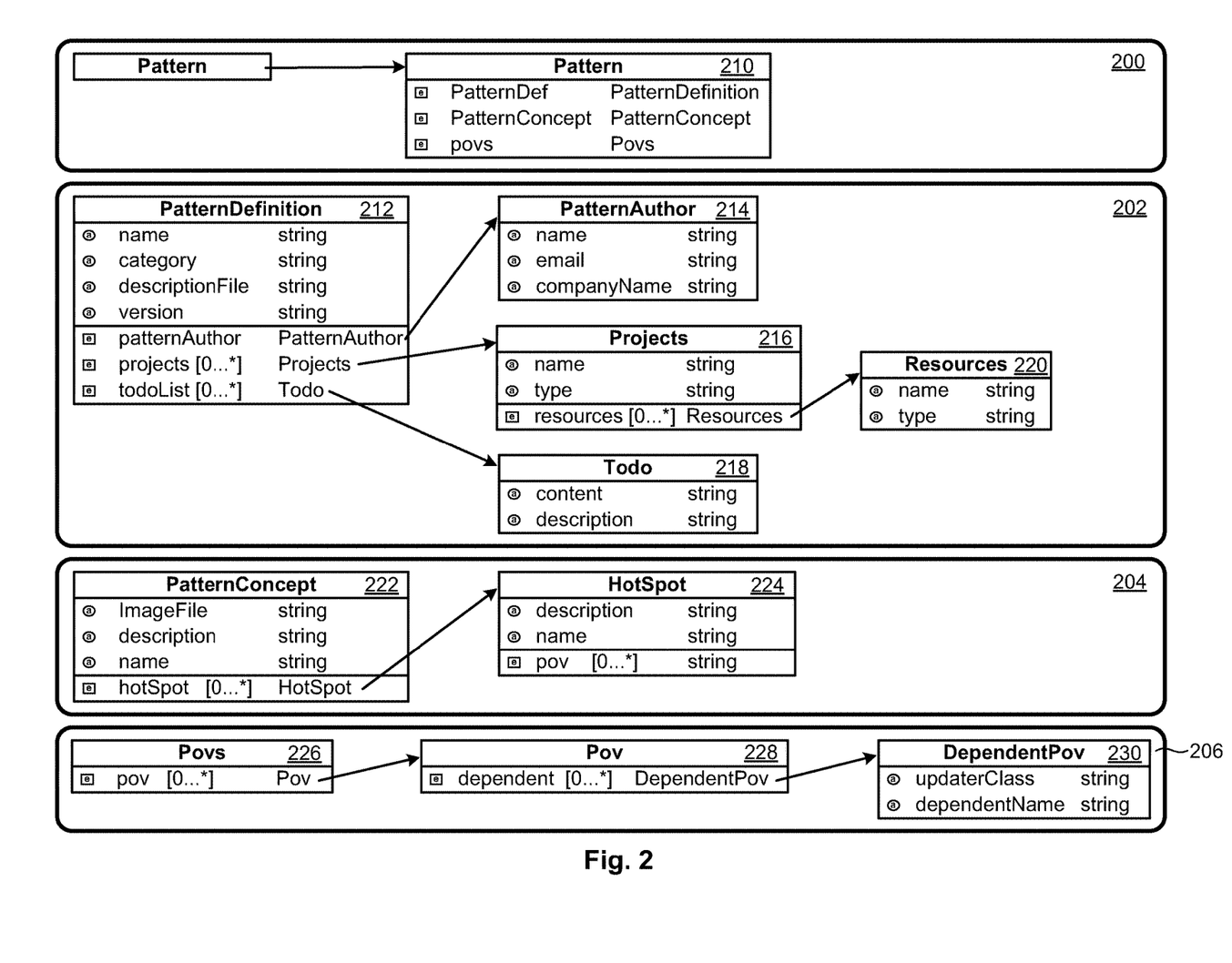
FIG. 2 is a graphical representation of various types of information that may be captured when creating a pattern from an existing solution.

Referring to FIG. 2, to create a pattern from an existing solution, the pattern author may be required to capture various types of information, such as is shown in boxes 200, 202, 204, 206. In certain embodiments, the pattern information in box 200 may be defined in the "Pattern_main.xsd" artifact 104. The pattern definition and pattern concept information in boxes 202, 204 may be defined in the "POV_struct.xsd" artifact 104. Similarly, the POV (point of variability) information in box 206 may be defined in the "POV_meta.xsd" artifact 104.

As shown in FIG. 2, a pattern 210 is the top-level class in the pattern meta model that captures all of the information pertaining to a pattern. This pattern class 210 has associated therewith a pattern definition 212, a pattern concept 222, and POVs 226. The pattern definition class 212 may include information such as the pattern's name, the category in which the pattern will be listed in a catalog, a description of the pattern, a version number of the pattern, and so forth. The pattern definition 212 may also include information about the pattern's author 214, such as the author's name, email, company name, or the like. The pattern definition 212 may also reference one or more projects 216 and associated resources 220 that were used to create the pattern. The pattern definition 212 may also include a "to do" list 218 that lists any steps that may be necessary to implement the pattern after the end user has instantiated the pattern.

The pattern concept class 222 references a high-level concept diagram of the pattern that captures the intent and functionality of the pattern. This high-level concept diagram may help the end user visualize the pattern and its relationship with elements outside the pattern. In certain embodiments, the high-level concept diagram is captured in an image file. One example of a concept diagram is illustrated in FIG. 5. The high-level concept diagram optionally includes one or more hot spots 224 that are associated with the pattern's points of variability. These hot spots 224 allow an end user to enter values for various points of variability on the concept diagram itself. One example of a hot spot 224 will be discussed in association with FIG. 6.

Finally, a "Povs" class 226 may have one or more points of variability 228 associated therewith. These points of variability 228 may have other dependent points of variability 230. For example, if an end user changes a value associated with a first POV, this change may affect the values associated with other POVs. The pattern 210 may track the dependencies between POVs such that when one POV is updated, other dependent POVs may be updated as well.

Referring to FIG. 3, a pattern may have many types of points of variability ranging from simple data values to extremely complex data values. These data values may vary from pattern to pattern. Although a standard set of POV data types may be provided to satisfy most common use cases, the pattern framework would also ideally allow a pattern author to build new POV types and plug them into the framework. These new POV types would ideally function just like the standard POV types. To achieve this objective, the meta model discussed herein exploits the functionality of XML schema "substitution groups" to model POVs. The diagram shown in FIG. 3 shows how various types of POVs may be included in (or added to or subtracted from) a substitution group.

As shown in FIG. 3, an abstract global element 300 named "pov," having an abstract complex type 228, named "Pov," is the head element 300 of the substitution group. The "simplePov," "complexPov," and "complexTablePov" POV types 304, 308, 312 are members of the substitution group. A concrete type 306, 310, 314, inheriting from the base "Pov" type 228, is defined for each type of POV.

To define a new point of variability, the pattern author may first define a global element for the point of variability and make it a member of the substitution group "patterns: pov". The author may then define a complex type for the point of variability that inherits from the base "Pov" type 228. The pattern author may put any elements (of simple or complex types) and/or attributes into this new type to capture the details of the point of variability. Once the two steps recited above are performed, the new point of variability will behave just like the standard POV types previously discussed. The new point of variability will get aggregated under the "Pattern" class.

Referring to FIG. 4, for complex POVs such as tables that have one or more columns, a pattern author needs to be able to capture a default value for each cell in the table. The default value needs to be compliant with the column type selected by the pattern author. For such complex POVs, the default values may be modeled explicitly since XML schema does not have the capability to specify a default value for each occurrence of a repeating element.

Figure 8:
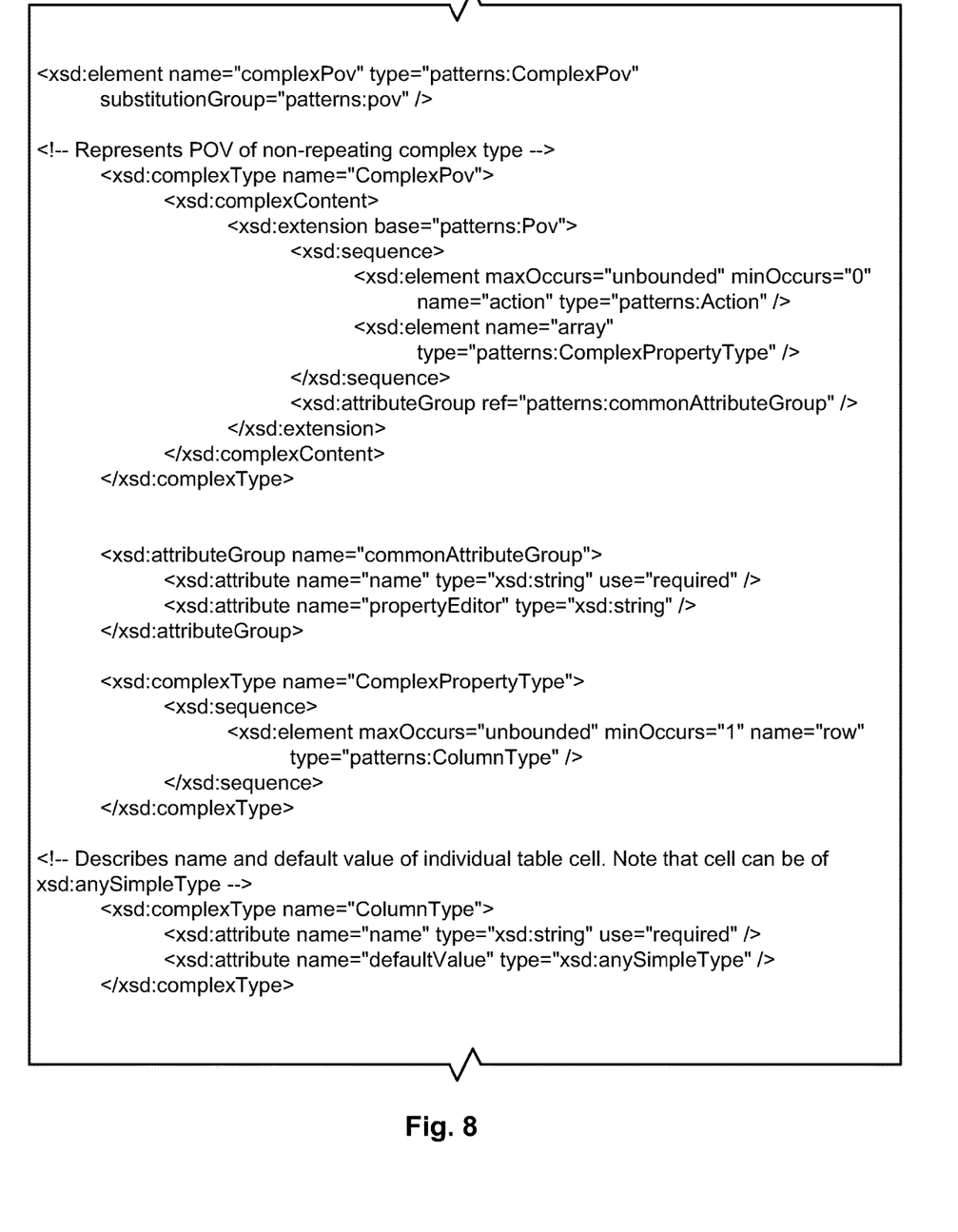
FIG. 8 is a code sample showing an example of an extensible markup language (XML) schema definition for a one-dimensional (i.e., single column) array of values.

FIG. 4 shows how the default values are modeled for the repeating elements in "ComplexPov" 310, which is a single column table, as well as the repeating elements in "ComplexTablePov" 314, which is a multi-column table. As shown, the element "array" in "ComplexPov" 310 is of "ComplexPropertyType" 404, which contains the repeating element "row" of "ColumnType" 406. The default value for each occurrence of the row is explicitly captured by the "defaultValue" attribute defined in "ColumnType" 406. A code sample showing an example of an XML schema definition for the single-column table (i.e., "ComplexPov" 310) is shown in FIG. 8.

As further shown in FIG. 4, the multiple column table "ComplexTablePov" 314 has an extra dimension of repeating elements. The element "table" in "ComplexTablePov" 314 is of "ComplexTablePropertyType" 408, which contains a repeating element "row" of "RowType" 410. The "RowType" 410 contains a repeating element "column" of "ColumnType" 412. The default value for each cell in the table is explicitly captured in the "defaultValue" attribute of "ColumnType" 412. Information is also captured for each column, including the column's name and the property editor used to edit values in the column. This information is captured using the repeating element "columnDescriptor" of "ColumnDescriptorType" 414. The pattern author will ideally programmatically ensure that the number of occurrences of "columnDescriptor" and "row" elements are identical, since there is no explicit mechanism in XML schema to enforce this rule. A code sample showing an example of an XML schema definition for the multiple-column table (i.e., "ComplexTablePov" 314) is shown in FIG. 9.

As further shown in FIG. 4, each of the POV types—i.e., the "SimplePov" type 306, the "ComplexPov" type 310, and the "ComplexTablePov" type 314—reference one or more actions 400 to be performed in association with the POV. These actions 400 designate what tasks or operations are to be performed with the POV values (i.e., what is to be done with the POV values). Each action 400 may reference one or more objects 402 that the action operates on.

Referring to FIG. 5, one example of a high-level concept diagram 506 for a pattern 500 is illustrated. In this example, the pattern 500 is an enterprise service bus (ESB) pattern called a "service gateway" or "service proxy." This concept diagram 506 is presented only by way of example and is not intended to be limiting. In this concept diagram 506, an ESB service gateway (proxy) is configured to route a service call dynamically, based on lookup rules from a service registry, and optionally log all request and response messages. The service gateway may act as a proxy to a variety of different services by providing a single entry point for incoming requests. All requesters may interact with a single endpoint address exposed by the gateway. The gateway is responsible for performing a common operation on every message and routing the request to the correct service provider.

As shown in FIG. 5, the concept diagram 506 includes one or more graphical elements to provide a high-level view of the participants in the pattern 500. These graphical elements include concept elements 502, representing concepts (e.g., participants) within the pattern 500, and relationship elements 504, representing relationships between the concept elements 502. In this example, the concept elements 502 include a client 502*a* to generate a service call, a log component 502*b* to optionally log requests and responses, a lookup component 502*c* to look up service providers in a service registry 502*e*, an invocation component 502*d* to invoke a service, a service registry 502*e* to store a list of service providers, and a service 502*f* to be invoked. The relationship elements 504 in this example are simply arrows or connectors showing the communication or data flow between the concept elements 502.

The concept diagram 506 provides a more intuitive way to visualize and configure patterns. The concept diagram 506 also provides a template or structure into which the user can enter the configuration values, allowing the user to work in a conceptual domain as opposed to a lower-level, tool-specific domain. The concept diagram 506 may allow the user to select desired concept elements 502 and enter configuration values associated with the concept elements 502. This allows the user to visualize the pattern 500 and overarching concepts 502 of the pattern 500 when entering the configuration values, and educates the user regarding the relationship between the lower-level configuration values and high-level pattern concepts 502.

Referring to FIG. 6, in selected embodiments, the concept diagram 506 may allow a user to hover over and click (with a mouse pointer or other selection device) a desired concept element 502 to enter configuration values associated with the concept element 502. In certain embodiments, the concept elements 502 or areas immediately around the concept elements 502 may be configured as "hot spots" 600. In certain embodiments, upon selecting one of these "hot spots" 600, a graphical user interface (GUI) input element 602 may appear to allow the user to enter configuration values associated with the concept element 502. For example, as shown in FIG. 6, a GUI input element 602 containing a check box 604 and a text box 606 appears next to the "log" concept element 502*b* when a user clicks on or hovers over the hot spot 600. In this example, the GUI input element 602 is a dialog box or window that allows the user to enable logging and enter a data source name associated with the logging operation. The user may then click an "apply" button 608 to accept the configuration values or a "cancel" button 610 to cancel the input operation. Other GUI widgets, such as combination boxes, drop-down lists, list boxes, radio buttons, scrollbars, sliders, or the like, may be used to input configuration values using the GUI input element 602.

Figure 7:
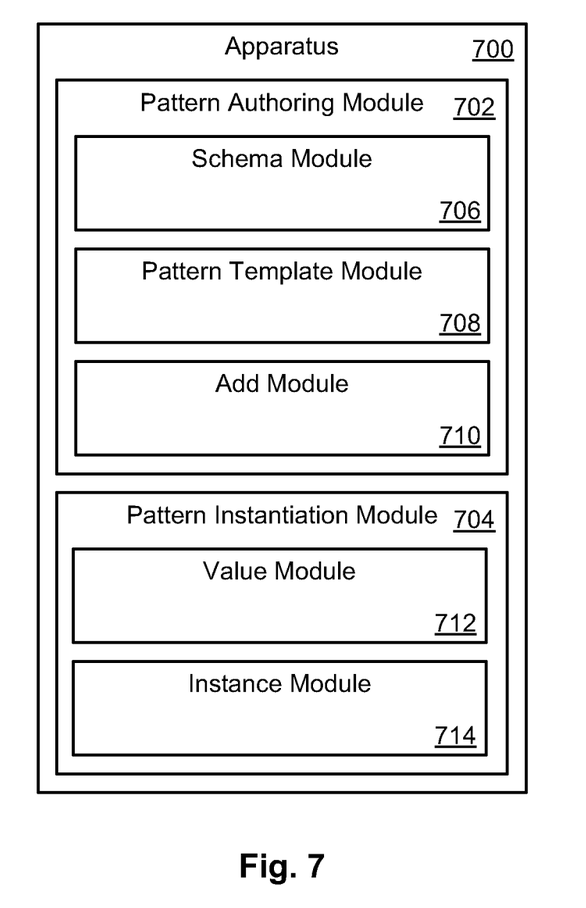
FIG. 7 is a high-level block diagram showing one embodiment of an apparatus for capturing patterns and associated points of variability.

Referring to FIG. 7, in certain embodiments, an apparatus 700, comprising one or more modules, may be provided to implement the functionality described in FIGS. 1 through 6. The modules may be embodied in hardware, software configured to operate on hardware, firmware, or a combination thereof. In selected embodiments, these modules include a pattern authoring module 702, for use by a pattern author, and a pattern instantiation module 704, for use by a pattern end user. The pattern authoring module 702 may include one or more of a schema module 706, a pattern template module 708, and an add module 710. The pattern instantiation module 704 may include one or more of a value module 712 and an instance module 714. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules.

The schema module 706 may provide a meta model to capture a pattern and associated points of variability. This meta model may be embodied in one or more artifacts, such as the "POV_meta.xsd," "POV_struct.xsd," and "Pattern_main.xsd" artifacts 104 previously described, although other artifacts are possible and within the scope of the invention. Once a meta model is provided, the pattern template module 708 generates a pattern template that captures a specific pattern and its particular points of variability. The points of variability may be captured in the "POV_meta.xml" artifact 108 as previously described. Using the authored pattern template, the schema module 706 generates a schema description of the points of variability for which an end user will supply values. This schema description may designate default values to populate the points of variability in the event the end user does not supply the values. These points of variability as well as their default values may be defined in an artifact, such as the "POV.xsd" artifact 112 previously described.

As mentioned above, the meta model may be used to capture points of variability associated with a pattern. In selected embodiments, the meta model defines various types of POVs that may be included in a pattern. These POV types may include simple POV types, such as integers or strings, or complex POV types, such as single or multi-dimensional arrays of values. In certain embodiments, the POV types are included in an XML schema "substitution group" which allows the POV types to be substituted for one another. An add module 710 may enable a pattern author to add new and/or custom POV types to the substitution group if and when they are needed.

Once a pattern template has been generated by the pattern authoring module 702, a value module 712 may capture values needed to populate the points of variability. In selected embodiments, the value module 712 captures the values in an artifact, such as the "POV.xml" artifact 124 previously described. In certain embodiments, the value module 712 allows the end user to change the values for the points of variability through a GUI or by importing an external XML file. Once these values are captured, the instance module 714 instantiates the pattern using the values captured by the value module 712, thereby generating a pattern instance 128.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A computer-implemented method, comprising:
    providing a first extensible markup language (XML) schema defining elements representing different point of variability (POV) data types for points of variability of an enterprise service bus (ESB) pattern, the elements belonging to an XML schema POV data-type substitution group;
    adding new substitutable POV data types created and substituted for one another by an end user to change POV data types used to instantiate an instance of the ESB pattern, and where the new substitutable POV data types of the XML schema POV data-type substitution group are derived from an abstract complex POV data type that forms a head element of the XML schema POV data-type substitution group that allows complex data type definitions of the new substitutable POV data types created by the end user to change the POV data types used to instantiate the instance of the ESB pattern to be derived from at least one of a simple POV data type and a complex POV data type, where the simple POV data type comprises one of an integer, a string, a floating point number, and a real number, and where the complex POV data type comprises one of a one-dimensional array of values and a multi-dimensional array of values, and where the new substitutable POV data types created by the end user comprise at least one action that each (i) specifies a programmatic operation to be performed using assigned point of variability values of a respective new substitutable POV data type and (ii) specifies at least one system object that each action operates on using the assigned point of variability values of the respective new substitutable POV data type;
    displaying, as part of a graphical user interface (GUI), a high-level concept diagram for the ESB pattern comprising a plurality of graphical elements including concept elements comprising a client, a log component, a lookup component, a service registry, an invocation component, and a service, and relationship elements representing relationships between the concept elements;
    creating at least one hot spot on the GUI for selecting a concept element, wherein upon selecting the at least one hot spot on the GUI, displays an input element allowing the end user to enter configuration values for the assigned points of variability values;
    instantiating the instance of the ESB pattern as a service gateway acting as a proxy to different services by providing a single entry point for incoming requests, the service gateway configured to route a service call dynamically based on lookup rules from a service registry and log all request and response messages by applying the respective programmatic operation of each of the at least one action of the new substitutable POV data types created and substituted by the end user to each of the respective at least one system object with the assigned points of variability values entered by the end user for each hot spot of the GUI.

2. The computer-implemented method of claim 1, further comprising:
    providing a second XML schema defining the points of variability for which the end user supplies values; and
    generating an instance of the second XML schema to supply the values.

3. The computer-implemented method of claim 2, where the second XML schema defines a default value for at least one of the points of variability for the end user supplies the values.

4. The computer-implemented method of claim 1, where responsive to instantiation of the instance of the ESB pattern, the instance of the ESB pattern tracks dependencies between different points of variability within the instance of the ESB pattern.

5. The computer-implemented method of claim 1, where responsive to instantiation of the instance of the ESB pattern, the instance of the ESB pattern updates, responsive to any value changes of any points of variability, any dependent points of variability that are dependent upon the respective changed value of the points of variability.

6. The computer-implemented method of claim 1, further comprising, responsive to ESB pattern author inputs:
    adding new POV data types to the XML schema POV data-type substitution group within a pattern framework that inherit from the abstract complex POV data type; and
    subtracting POV data types from the XML schema POV data-type substitution group within the pattern framework.

7. An apparatus, comprising:
    a plurality of modules, where the modules are implemented in at least one of hardware and software operating on hardware, the modules comprising:

a schema module providing a first extensible markup language (XML) schema defining elements representing different point of variability (POV) data types for points of variability of an enterprise service bus (ESB) pattern, where the elements belong to an XML schema POV data-type substitution group;

an add module adding new substitutable POV data types created and substituted for one another by an end user to change POV data types used to instantiate an instance of the ESB pattern, and where the new substitutable POV data types of the XML schema POV data-type substitution group are derived from an abstract complex POV data type that forms a head element of the XML schema POV data-type substitution group that allows complex data type definitions of the new substitutable POV data types created by the end user to change the POV data types used to instantiate the instance of the ESB pattern to be derived from at least one of a simple POV data type and a complex POV data type, where the simple POV data type comprises one of an integer, a string, a floating point number, and a real number, and where the complex POV data type comprises one of a one-dimensional array of values and a multi-dimensional array of values, and where the new substitutable POV data types created by the end user comprise at least one action that each (i) specifies a programmatic operation to be performed using assigned point of variability values of a respective new substitutable POV data type and (ii) specifies at least one system object that each action operates on using the assigned point of variability values of the respective new substitutable POV data type;

a value module displaying, as part of a graphical user interface (GUI), a high-level concept diagram for the ESB pattern comprising a plurality of graphical elements including concept elements comprising a client, a log component, a lookup component, a service registry, an invocation component, and a service, and relationship elements representing relationships between the concept elements;

creating, by the value module, at least one hot spot on the GUI for selecting a concept element, wherein upon selecting the at least one hot spot on the GUI, displays an input element allowing the end user to enter configuration values for the assigned points of variability values; and an instance module instantiating the instance of the ESB pattern as a service gateway acting as a proxy to different services by providing a single entry point for incoming requests, the service gateway configured to route a service call dynamically based on lookup rules from a service registry and log all request and response messages by applying the respective programmatic operation of each of the at least one action of the new substitutable POV data types created and substituted by the end user to each of the respective at least one system object with the assigned points of variability values entered by the end user for each hot spot of the GUI.

8. The apparatus of claim 7, where the schema module is further configured to provide a second XML schema defining the points of variability for which the end user supplies values; and the value module is configured to generate an instance of the second XML schema to supply the values.

9. The apparatus of claim 8, where the second XML schema defines a default value for at least one of the points of variability for which the end user supplies the values.

10. The apparatus of claim 7, where responsive to instantiation of the instance of the ESB pattern by the instance module, the instance of the ESB pattern tracks dependencies between different points of variability within the instance of the ESB pattern.

11. The apparatus of claim 7, where responsive to instantiation of the instance of the ESB pattern by the instance module, the instance of the ESB pattern updates, responsive to any value changes of any points of variability, any dependent points of variability that are dependent upon the respective changed points of variability.

12. The apparatus of claim 7, further comprising, responsive to software solution pattern author inputs:

adding new POV data types to the XML schema POV data-type substitution group within a pattern framework that inherit from the abstract complex POV data type; and subtracting POV data types from the XML schema POV data-type substitution group within the pattern framework.

13. A computer program product comprising a non-transitory computer-readable medium having computer-usable program code embodied therein, where the computer-usable program code when executed on a computer causes the computer to:

provide a first extensible markup language (XML) schema defining elements representing different point of variability (POV) data types for points of variability of an enterprise service bus (ESB) pattern, the elements belonging to an XML schema POV data-type substitution group;

adding new substitutable POV data types created and substituted for one another by an end user to change POV data types used to instantiate an instance of the ESB pattern, and where the new substitutable POV data types of the XML schema POV data-type substitution group are derived from an abstract complex POV data type that forms a head element of the XML schema POV data-type substitution group that allows complex data type definitions of the new substitutable POV data types created by the end user to change the POV data types used to instantiate the instance of the ESB pattern to be derived from at least one of a simple POV data type and a complex POV data type, where the simple POV data type comprises one of an integer, a string, a floating point number, and a real number, and where the complex POV data type comprises one of a one-dimensional array of values and a multi-dimensional array of values, and where the new substitutable POV data types created by the end user comprise at least one action that each (i) specifies a programmatic operation to be performed using assigned point of variability values of a respective new substitutable POV data type and (ii) specifies at least one system object that each action operates on using the assigned point of variability values of the respective new substitutable POV data type;

display, as part of a graphical user interface (GUI), a high-level concept diagram for the ESB pattern comprising a plurality of graphical elements including concept elements comprising a client, a log component, a lookup component, a service registry, an invocation component, and a service, and relationship elements representing relationships between the concept elements;

create at least one hot spot on the GUI for selecting a concept element, wherein upon selecting the at least one hot spot on the GUI, displays an input element allowing the end user to enter configuration values for the assigned points of variability values; and instantiate the instance of the ESB pattern as a service gateway acting as a proxy to different services by providing a single entry point for incoming requests, the service gateway configured to route a service call dynamically based on lookup rules from a service registry and log all request and response messages by applying the respective programmatic operation of each of the at least one action of the new substitutable POV data types created and substituted by the end user to each of the respective at least one system object with the assigned points of variability values entered by the end user for each hot spot of the GUI.

14. The computer program product of claim 13, where the computer-usable program code, when executed on the computer, further causes the computer to:

provide a second XML schema defining the points of variability for which the end user supplies values; and generate an instance of the second XML schema to supply the values.

15. The computer program product of claim 14, where the second XML schema defines a default value for at least one of the points of variability for which the end user supplies the values.

16. The computer program product of claim 13, where responsive to instantiation of the instance of the ESB pattern, the instance of the ESB pattern tracks dependencies between different points of variability within the instance of the ESB pattern.

17. The computer program product of claim 13, where responsive to instantiation of the instance of the ESB pattern, the instance of the ESB pattern updates, responsive to any value changes of any points of variability, any dependent points of variability that are dependent upon the respective changed points of variability.

18. The computer program product of claim 13, where the computer-usable program code, when executed on the computer, further causes the computer to, responsive to ESB pattern author inputs:

add new POV data types to the XML schema POV data-type substitution group within a pattern framework that inherit from the abstract complex POV data type; and subtract POV data types from the XML schema POV data-type substitution group within the pattern framework.

* * * * *